(12) United States Patent
Watkins et al.

(10) Patent No.: US 7,516,496 B2
(45) Date of Patent: *Apr. 7, 2009

(54) IDENTIFYING UNAUTHORIZED COMMUNICATION SYSTEMS BASED ON THEIR MEMORY CONTENTS

(75) Inventors: Robert G. Watkins, Vienna, VA (US); Andrew L. Wick, McLean, VA (US)

(73) Assignee: AOL LLC, Dulles, VA (US)

( * ) Notice: Subject to any disclaimer, the term of this patent is extended or adjusted under 35 U.S.C. 154(b) by 658 days.

This patent is subject to a terminal disclaimer.

(21) Appl. No.: 11/216,027

(22) Filed: Sep. 1, 2005

(65) Prior Publication Data

US 2006/0053489 A1 Mar. 9, 2006

Related U.S. Application Data

(63) Continuation of application No. 09/851,121, filed on May 9, 2001, now Pat. No. 6,954,861, which is a continuation of application No. 09/749,638, filed on Dec. 28, 2000, now abandoned.

(60) Provisional application No. 60/218,243, filed on Jul. 14, 2000.

(51) Int. Cl.
*H04L 9/32* (2006.01)
*G06F 15/16* (2006.01)
*G06F 21/20* (2006.01)

(52) U.S. Cl. .................... 726/29; 705/56; 713/179; 713/181; 709/227

(58) Field of Classification Search ............... None
See application file for complete search history.

(56) References Cited

U.S. PATENT DOCUMENTS

| | | | |
|---|---|---|---|
| 5,606,609 | A | 2/1997 | Houser et al. |
| 5,949,152 | A | 9/1999 | Tagawa et al. |
| 6,044,471 | A | 3/2000 | Colvin |
| 6,073,123 | A | 6/2000 | Staley |
| 6,134,659 | A | 10/2000 | Sprong et al. |
| 6,889,212 | B1 | 5/2005 | Wang et al. |

FOREIGN PATENT DOCUMENTS

WO     WO 99/66422     12/1999

*Primary Examiner*—Christopher A Revak
(74) *Attorney, Agent, or Firm*—Fish & Richardson P.C.

(57) ABSTRACT

An authorized client communication system seeking access to a host communication system may be identified by locating a memory segment within the client communication system that stores client software used to access the host computer system. The memory segment then is examined to determine whether the client software stored in the memory segment corresponds to client software for an official client communication, system. Communications from the client communication system are terminated when the client software in the memory segment is determined to diverge from software for an official client communication system.

21 Claims, 9 Drawing Sheets

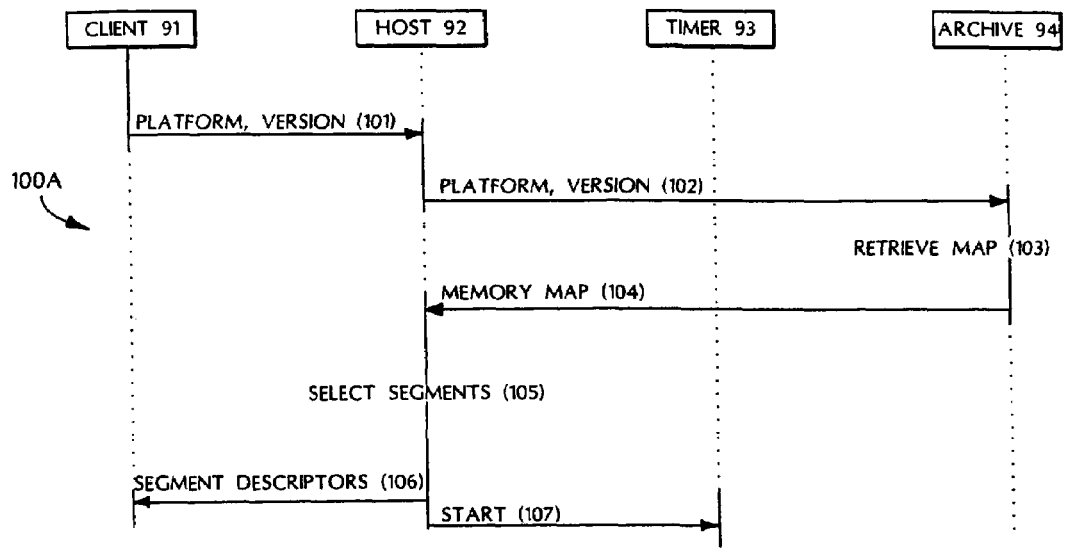
FIG. 10A INITIAL INTERACTIONS AMONG COMPONENTS
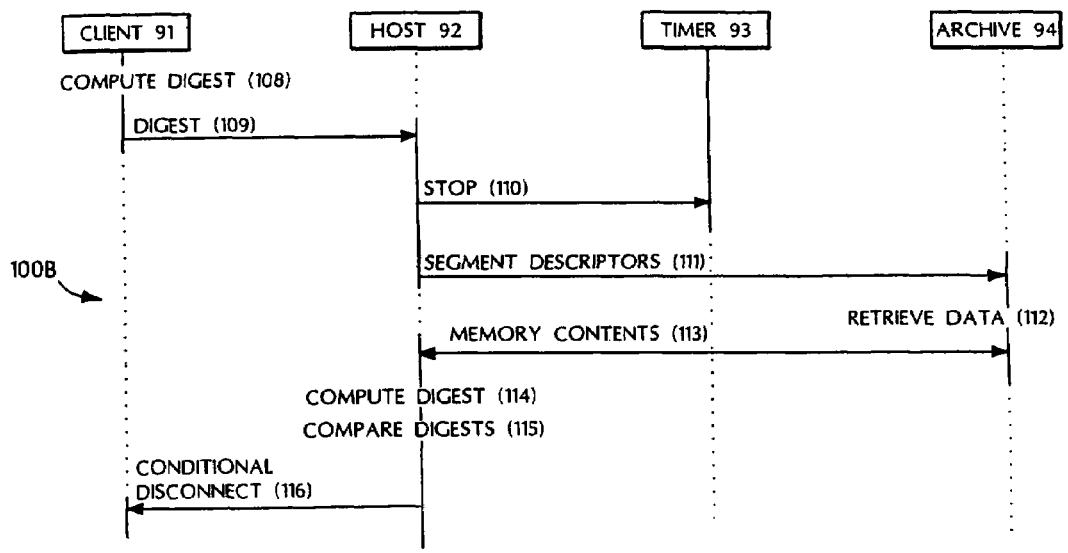
FIG. 10B FINAL INTERACTION WHEN CLIENT RESPONDS

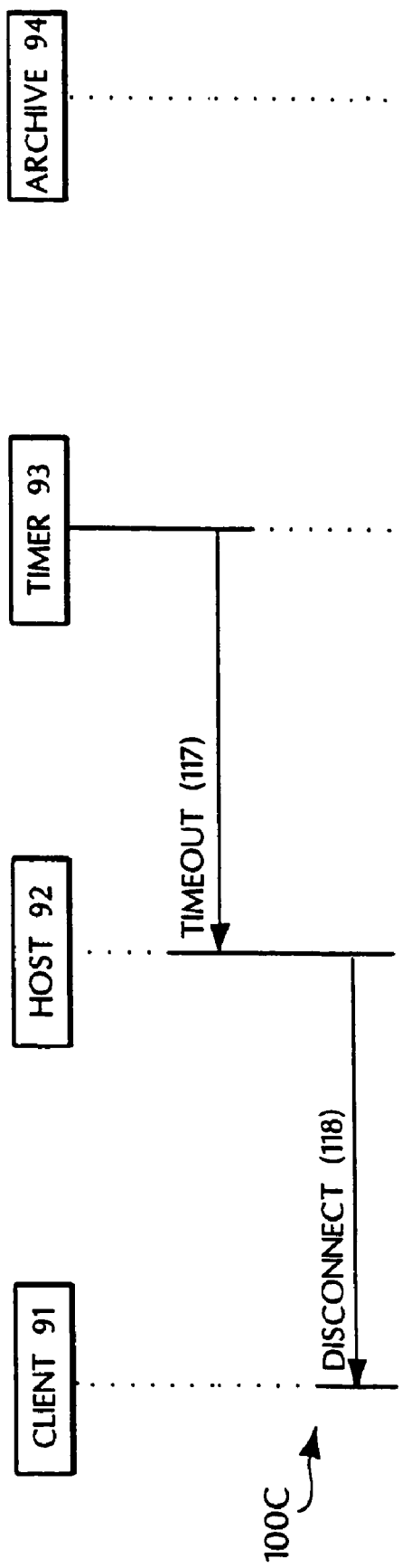
FIG. 10C FINAL INTERACTION WHEN CLIENT FAILS TO RESPOND

IDENTIFYING UNAUTHORIZED COMMUNICATION SYSTEMS BASED ON THEIR MEMORY CONTENTS

This application is a continuation of Ser. No. 09/851,121 filed May 9, 2001 now U.S. Pat. No. 6,954,861, entitled "Identifying unauthorized communication systems based on their memory contents," which is a continuation of U.S. application Ser. No. 09/749,638, filed Dec. 28, 2000, now abandoned, and claims the benefit of U.S. Provisional Application No. 60/218,243, now expired, filed Jul. 14, 2000, each of which is incorporated by reference.

TECHNICAL FIELD

This invention relates to identifying unauthorized communication systems.

BACKGROUND

For two or more computer systems to communicate, at least one of those systems is generally configured with software enabling the communication. For instance, in a computer network configured for client-server communications, the client system is configured with client software that enables access to and interaction with the server system.

Systems employing client-server communications may be subject to security attacks. One form of security attack involves the use of an unauthorized client system that imitates an authorized client system to achieve the access ordinarily reserved for authorized client systems.

SUMMARY

A host communication system (e.g., an online service provider) may defend against certain security attacks by determining whether a client communication system (e.g., a personal computer) is an authorized communication system. The determination may be performed during an initiation of the communication session, or at some later time.

In one general aspect, an authorized client communication system seeking access to a host communication system may be identified by locating a memory segment within the client communication system that stores client software used to access the host computer system. The memory segment then is examined to determine whether the client software stored in the memory segment corresponds to client software for an official client communication system. Communications from the client communication system are terminated when the client software in the memory segment is determined to diverge from client software for an official client communication system.

Implementations may include one or more of the following features. For example, locating the memory segment may include identifying a type or version of the client software being used by the client communication system to enable communication, and locating the memory segment of the client communication system based on the identified type or version. The type or version of the client software may be identified by, for example, receiving information from the client communication system indicating the type or version of the client software. This information may be received when the communication session is initiated, or at some other time. The type or version also may be determined by performing a diagnostic on the client communication system to automatically determine the type or version.

Locating the memory segment may include locating a memory segment of the client communication system that includes client software remaining unchanged in a corresponding memory segment of an official client communication system, where the memory segment that is located may be user independent. Locating the memory segment also may include identifying a memory segment based on a random selection among several memory segments that store client software, that are user independent, and/or that remain unchanged between different systems.

To determine whether the client software stored in the located memory segment corresponds to predictable client software for an official client communication system, the client software stored in the memory segment may be compared with the corresponding client software of the official client communication system. This comparison may be made by performing a mathematical computation on the contents of the memory segment and comparing the result of the mathematical computation against the results of a corresponding mathematical computation on the corresponding client software of the official communication system. The mathematical computations may include, for example, a check sum, a hashing algorithm, a MessageDigest™ (MD5) algorithm, or a Securehash algorithm (SHA1).

Implementations may include a method or process, an apparatus or system, or computer software on a computer medium.

The details of one or more implementation are set forth in the accompanying drawings and the description below. Other features and advantages will be apparent from the description and drawings, and from the claims.

DESCRIPTION OF DRAWINGS

FIGS. 10A-10C are process flowcharts showing aspects of the process of FIG. 9.

Like reference symbols in the various drawings indicate like elements.

DETAILED DESCRIPTION

For illustrative purposes, FIGS. 1-6 describe a communications system for implementing techniques for transferring files between subscribers of an instant messaging host complex. For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
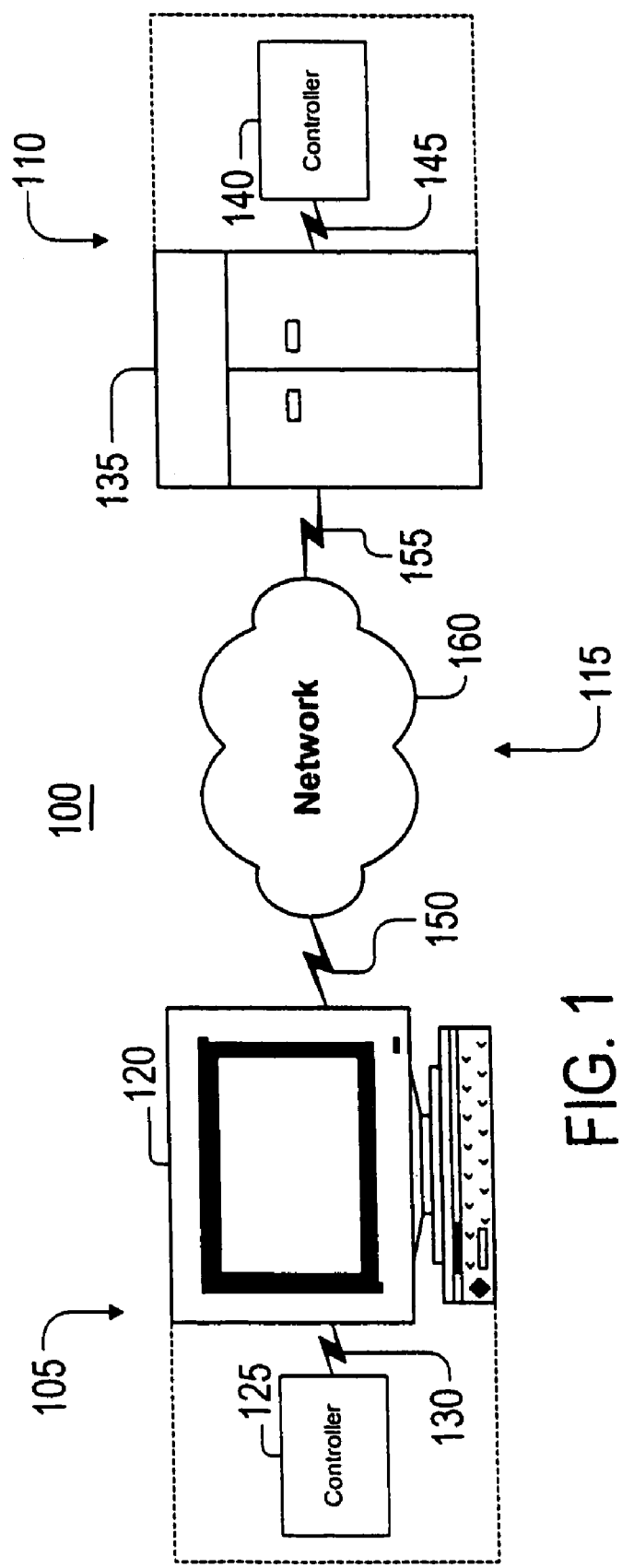
FIG. 1 is a block diagram illustrating an exemplary communication system capable of identifying unauthorized communication systems.

Referring to FIG. 1, a communications system 100 is capable of delivering and exchanging data between a client system 105 and a host system 110 through a communications link 115. The client system 105 typically includes one or more client devices 120 and/or client controllers 125. For example, the client system 105 may include one or more general-purpose computers (e.g., personal computers), one or more special-purpose computers (e.g., devices specifically programmed to communicate with each other and/or the host system 110), or a combination of one or more general-purpose computers and one or more special-purpose computers. The client system 105 may be arranged to operate within or in concert with one or more other systems, such as for example, one or more LANs ("Local Area Networks") and/or one or more WANs ("Wide Area Networks").

The client device 120 is generally capable of executing instructions under the command of a client controller 125. The client device 120 is connected to the client controller 125 by a wired or wireless data pathway 130 capable of delivering data.

The client device 120 and client controller 125 each typically includes one or more hardware components and/or software components. An example of a client device 120 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. An example of client controller 125 is a software application loaded on the client device 120 for commanding and directing communications enabled by the client device 120. Other examples include a program, a piece of code, an instruction, a device, a computer, a computer system, or a combination thereof, for independently or collectively instructing the client device 120 to interact and operate as described herein. The client controller 125 may be embodied permanently or temporarily in any type of machine, component, physical or virtual equipment, storage medium, or propagated signal capable of providing instructions to the client device 120.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, and xDSL), radio, television, cable, satellite, and/or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

The host system 110 includes a host device 135 capable of executing instructions under the command and direction of a host controller 140. The host device 135 is connected to the host controller 140 by a wired or wireless data pathway 145 capable of carrying and delivering data.

The host system 110 typically includes one or more host devices 135 and/or host controllers 140. For example, the host system 110 may include one or more general-purpose computers (e.g., personal computers), one or more special-purpose computers (e.g., devices specifically programmed to communicate with each other and/or the client system 105), or a combination of one or more general-purpose computers and one or more special-purpose computers. The host system 110 may be arranged to operate within or in concert with one or more other systems, such as, for example, one or more LANs ("Local Area Networks") and/or one or more WANs ("Wide Area Networks").

The host device 135 and host controller 140 each typically includes one or more hardware components and/or software components. An example of a host device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. An example of host controller 140 is a software application loaded on the host device 135 for commanding and directing communications enabled by the host device 135. Other examples include a program, a piece of code, an instruction, a device, a computer, a computer system, or a combination thereof, for independently or collectively instructing the host device 135 to interact and operate as described herein. The host controller 140 may be embodied permanently or temporarily in any type of machine, component, physical or virtual equipment, storage medium, or propagated signal capable of providing instructions to the host device 135.

Figure 2:
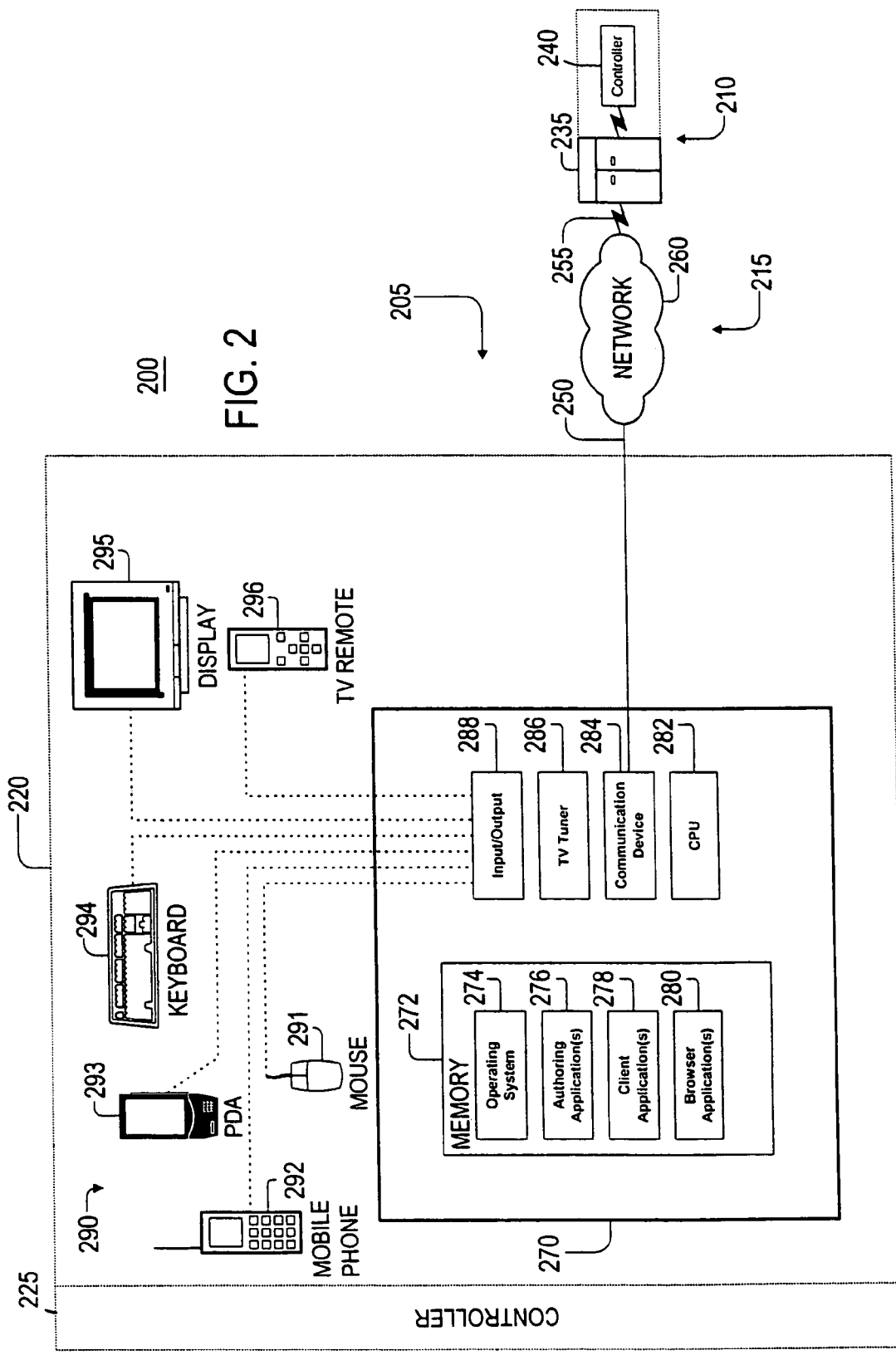
FIGS. 2-6 are diagrams illustrating various aspects of the communication system of FIG. 1.

FIG. 2 illustrates a communication system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communication system of FIG. 2 are broadly described above with respect to FIG. 1. In particular, the host system 210 and communications link 215 typically have attributes comparable to those described with respect to host system 110 and communications link 115 of FIG. 1, respectively. Likewise, the client system 205 of FIG. 2 typically has attributes comparable to and may illustrate one possible embodiment of the client system 105 of FIG. 1.

The client device 220 typically includes a general purpose computer 270 having an internal or external storage 272 for storing data and programs such as an operating system 274 (e.g., DOS, Windows™, Windows95™, Windows98™, Windows2000™, Windows NT™, OS/2, and Linux) and one or more application programs. Examples of application programs include authoring applications 276 (e.g., word processing, database programs, spreadsheet programs, and graphics programs) capable of generating documents or other electronic content; client applications 278 (e.g., AOL client, CompuServe client, AIM client, AOL TV client, and ISP client) capable of communicating with other computer users, accessing various computer resources, and viewing, creating, or otherwise manipulating electronic content; and browser applications 280 (e.g., Netscape's Navigator and Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and performed by one or more device(s) external to the general purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 to enable a wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, and/or a TV remote control 296 for receiving information from and rendering information to subscribers. Other examples may include voice recognition and synthesis devices.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities and function as a client device 220 by accessing the delivery network 260 and communicating with the host system 210. Furthermore, the client system 205 may include one, some or all of the components and devices described above.

Figure 3:
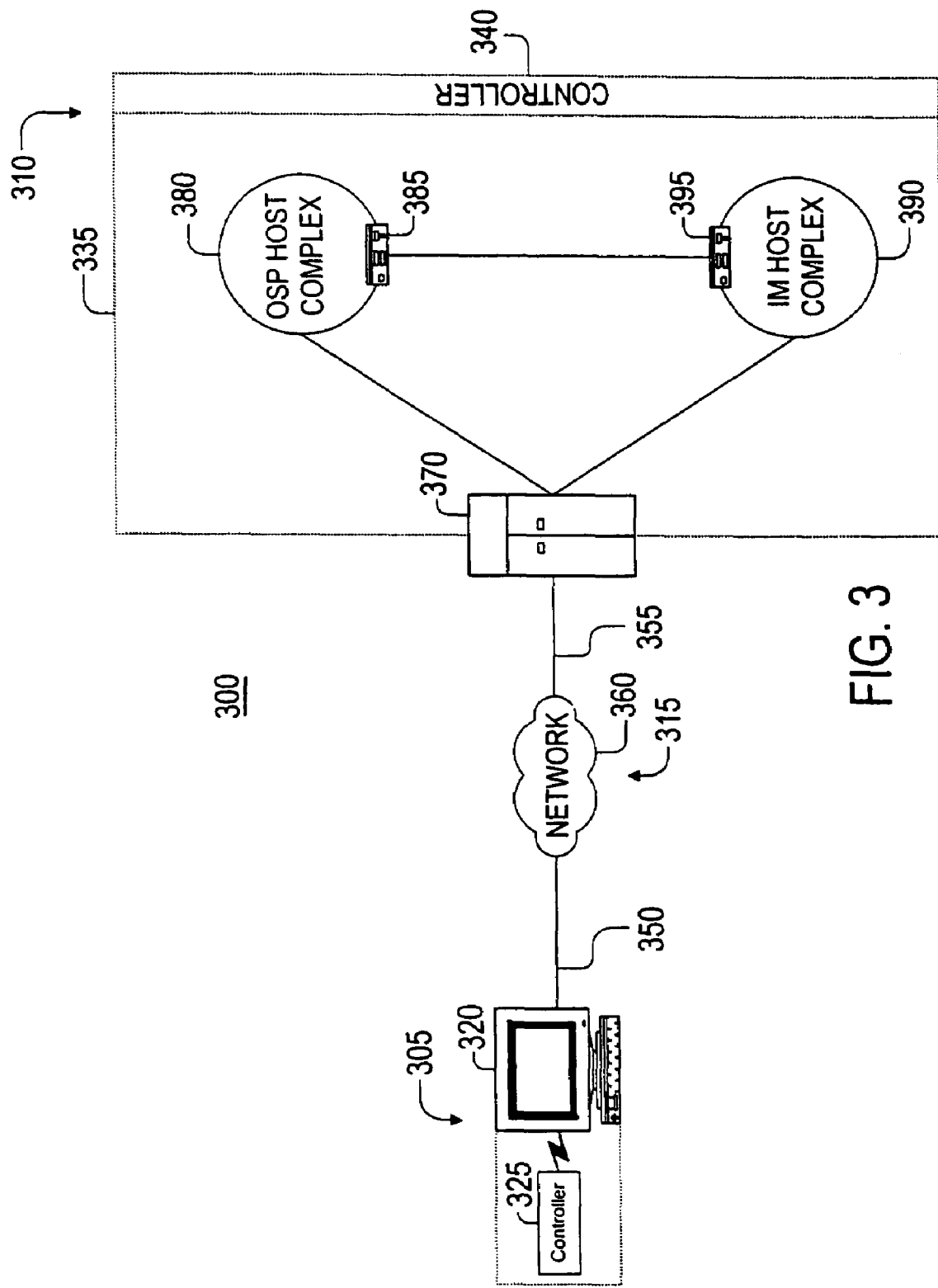

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communication system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2, respectively. Likewise, the host system 310 of FIG. 3 may have attributes comparable to and may illustrate one possible embodiment of the host systems 110 and 210 shown in FIGS. 1 and 2, respectively.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. However, in other implementations, as described above, the host controller 340 may include any of several other programs, machines, and devices operating independently or collectively to control the host device 335.

The host device 335 includes a login server 370 for enabling access by subscribers and routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 may include communication software, for example, an OSP client application and an IM client application. The OSP and IM communication software applications are designed to facilitate the subscriber's interactions with the respective services and, in particular, may provide access to all the services available within the respective host complexes. For example, Instant Messaging allows a subscriber to use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

Typically, the OSP host complex 380 supports different services, such as email, discussion groups, chat, news services, and Internet access. The OSP host complex 380 is generally designed with an architecture that enables the machines within the OSP host complex 380 to communicate with each other, certain protocols (i.e., standards, formats, conventions, rules, and structures) being employed to enable the transfer of data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex 395 gateway may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding a protocol anticipated by a destination complex, which enables any necessary protocol conversion to be performed incident to the transfer of data from one complex to another. For instance, the OSP host complex 380 and IM host complex 390 may use different protocols such that transferring data between the complexes requires protocol conversion by or at the request of the OSP host complex gateway 385 and/or the IM host complex gateway 395.

Figure 4:
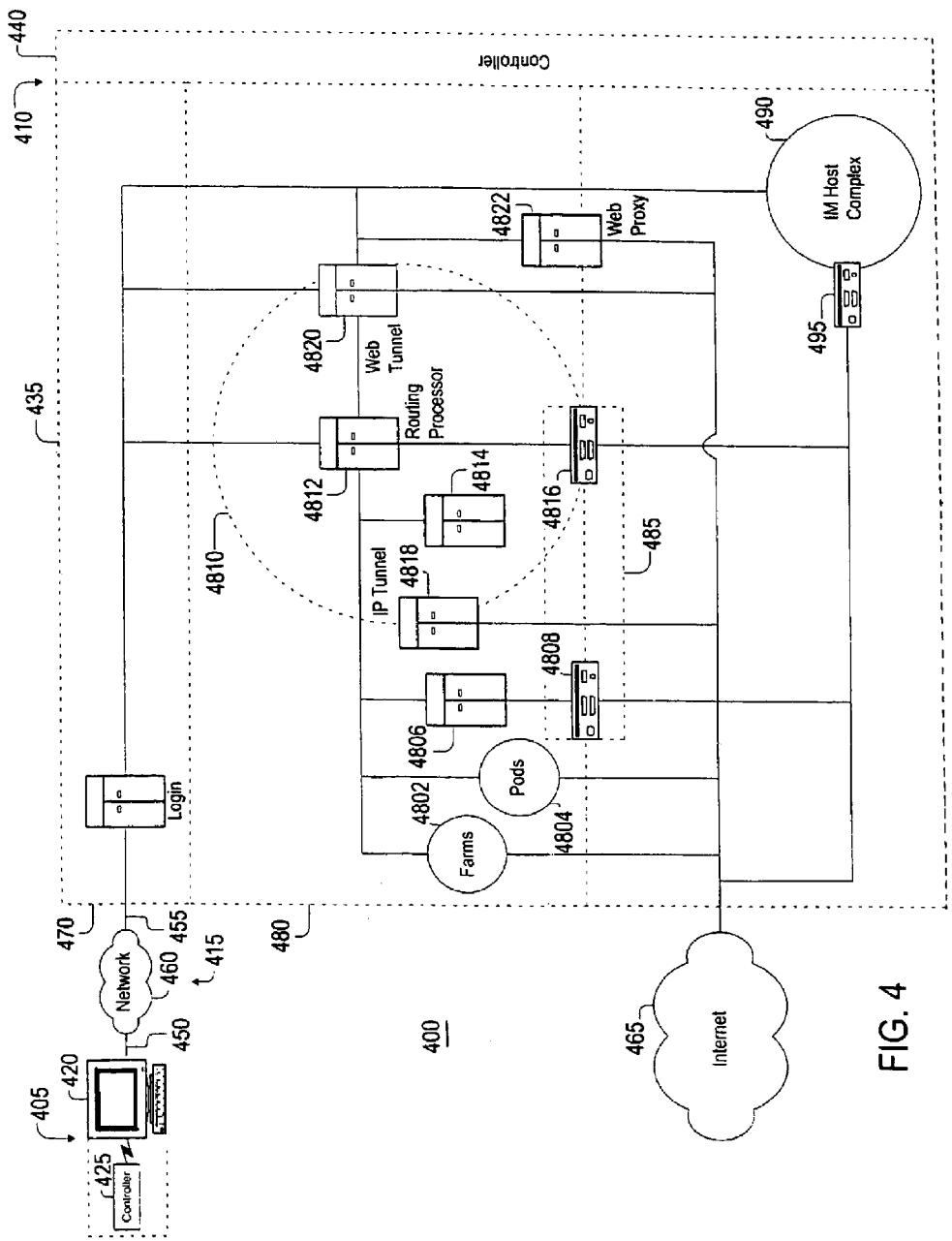

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 enabling communications through the one or more delivery networks 460. As shown, the client system 405 may access the Internet 46.5 through the host system 410.

Examples of each element within the communication system of FIG. 4 are broadly described above with respect to FIGS. 1-3. In particular, the client system 405 and the communications link 415 typically have attributes comparable to those described with respect to client systems 105, 205, and 305 and communications links 115, 215, and 315 of FIGS. 1-3, respectively. Likewise, the host system 410 of FIG. 4 may have attributes comparable to and may illustrate one possible embodiment of the host systems 110, 210, and 310 shown in FIGS. 1-3, respectively. However, FIG. 4 describes an aspect of the host system 410, focusing primarily on one particular implementation of OSP host complex 480.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using OSP protocols that may or may not be exclusive or proprietary. The client controller 425 also may include applications, such as an IM client application and/or an Internet browser application, for communicating with the IM host complex 490 and the Internet 465.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. However, in other implementations, as described above, the host controller 440 may include any of several other programs, machines, and devices operating independently or collectively to control the host device 435.

The host device 435 includes a login server 470 capable of enabling communications between client systems 405 and various elements of the host system 410, including elements such as OSP host complex 480 and IM host complex 490. The login server 470 may implement one or more authorization procedures to enable simultaneous access to one or more of these elements.

The OSP host complex 480 and the IM host complex 490 are typically connected through one or more OSP host complex gateways 485 and one or more IM host complex gateways 495. Each OSP host complex gateway 485 and IM host complex gateway 495 may generally perform protocol conversions necessary to enable communication between one or more of the OSP host complex 480, the IM host complex 490, and the Internet 465.

The OSP host complex 480 supports a set of services to be accessed through and/or performed by from one or more servers located internal to and external from the OSP host complex 480. Servers external to the OSP host complex 480 may communicate using the Internet 465. Servers internal to the OSP complex 480 may be arranged in one or more configurations. For example, servers may be arranged in large centralized clusters identified as farms 4802 or in localized clusters identified as pods 4804.

More specifically, farms 4802 are groups of servers located at centralized locations within the OSP host complex 480. Farms 4802 generally are dedicated to providing particular functionality and services to subscribers and clients from a centralized location, regardless of the location of the subscriber or client. Farms 4802 are particularly useful for providing services that depend upon other remotely-located or performed processes and services for information, such as, for example, chat, email, instant messaging, news, newsgroups, search, stock updates, and weather. Thus, farms 4802 tend to rely on connections with external resources such as the Internet 465 and/or other servers within the OSP host complex 480.

By contrast to farms 4802, pods 4804 are clusters of localized servers that provide some services offered by the OSP host complex 480 from a location local to the service or information recipient, thus reducing and avoiding time delays and congestion inherent in centralized processing. Each pod 4804 includes one or more interrelated servers capable of operating together to provide one or more services offered by the OSP host complex 480 in a geographically localized manner, the servers within a pod 4804 generally operating independently rather than relying on resources external to the pod 4804 to operate. A pod 4804 may cache content received from external sources, such as farms 4802 or the Internet 465, making frequently requested information readily available to the local service or information recipients served by the pod 4804. In this way, pods 4804 are particularly useful in providing services that are independent of other processes and servers such as, for example, routing to other localized resources or recipients, providing access to keywords and geographically specific content, providing access to routinely accessed information, and downloading certain software and graphical interface updates with reduced processing time and congestion. The determination of which servers and processes are located in the pod 4804 is made by the OSP according to load distribution, frequency of requests, demographics, and other factors.

In addition to farms 4802 and pods 4804, the implementation of FIG. 4 also includes one or more non-podded and non-farmed servers 4806. In general, the servers 4806 may be dedicated to performing a particular service or information that relies on other processes and services for information and may be directly or indirectly connected to resources outside of the OSP host complex 480, such as the Internet 465 and the IM host complex 490, through an OSP gateway 4808 within OSP host complex gateway 485. In the event that subscriber usage of a particular service or information of the servers 4806 becomes relatively high, those servers 4806 may be integrated into a farm or pod as appropriate.

In the implementation of FIG. 4, one particular exemplary pod 4810 is shown in more detail. Pod 4810 includes a routing processor 4812. In a packet-based implementation, the client system 405 may generate information requests, convert the requests into data packets, sequence the data packets, perform error checking and other packet-switching techniques, and transmit the data packets to the routing processor 4812. Upon receiving data packets from the client system 405, the routing processor 4812 may directly or indirectly route the data packets to a specified destination within or outside of the OSP host complex 480. In general, the routing processor 4812 will examine an address field of a data request, use a mapping table to determine the appropriate destination for the data request, and direct the data request to the appropriate destination.

For example, in the event that a data request from the client system 405 can be satisfied locally, the routing processor 4812 may direct the data request to a local server 4814 in the pod 4810. In the event that the data request cannot be satisfied locally, the routing processor 4812 may direct the data request internally to one or more farms 4802, one or more other pods 4804, or one or more non-podded servers 4806 in the OSP host complex 480, or the routing processor 4812 may direct the data request externally to elements such as the IM host complex 490 through an OSP/pod gateway 4816.

The routing processor 4812 also may direct data requests and/or otherwise facilitate communication between the client system 405 and the Internet 465 through the OSP/pod gateway 4816. In one implementation, the client system 405 uses an OSP client application to convert standard Internet content and protocols into OSP protocols and vice versa, where necessary. For example, when a browser application transmits a request in a standard Internet protocol, the OSP client application can intercept the request, convert the request into an OSP protocol and send the converted request to the routing processor 4812 in the OSP host complex 480. The routing processor 4812 recognizes the Internet 465 as the destination and routes the data packets to an IP ("Internet Protocol") tunnel 4818. The IP tunnel 4818 converts the data from the OSP protocol back into standard Internet protocol and transmits the data to the Internet 465. The IP tunnel 4818 also converts the data received from the Internet in the standard Internet protocol back into the OSP protocol and sends the data to the routing processor 4812 for delivery back to the client system 405. At the client system 405, the OSP client application converts the data in the OSP protocol back into standard Internet content for communication with the browser application.

The IP tunnel 4818 may act as a buffer between the client system 405 and the Internet 465, and may implement content filtering and time saving techniques. For example, the IP tunnel 4818 can check parental controls settings of the client system 405 and request and transmit content from the Internet 465 according to the parental control settings. In addition, the IP tunnel 4818 may include a number a caches for storing frequently accessed information. If requested data is determined to be stored in the caches, the IP tunnel 4818 may send the information to the client system 405 from the caches and avoid the need to access the Internet 465.

In another implementation, the client system 405 may use standard Internet protocols and formatting to access pods 4810 and the Internet 465. For example, the subscriber can use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol"), and routed to a web tunnel 4820. The web tunnel 4820 may be a L2TP ("Layer Two Tunneling Protocol") tunnel capable of establishing a point-to-point protocol (PPP) session with the client system 405. The web tunnel 4820 provides a gateway to the routing processor 4812 within the pod 4810, the Internet 465, and a web proxy 4822.

The web proxy 4822 can look up subscriber information from the IP address of the client system 405 to determine demographic information such as the subscriber's parental control settings. In this way, the web proxy 4822 can tailor the subscriber's content and user interfaces. The web proxy 4822 can also perform caching functions to store certain URLs ("Uniform Resource Locators") and other electronic content so that the web proxy 4822 can locally deliver information to the client system 405 and avoid the need to access the Internet 465 in the event that data requested by the client system 405 has been cached.

Figure 5:
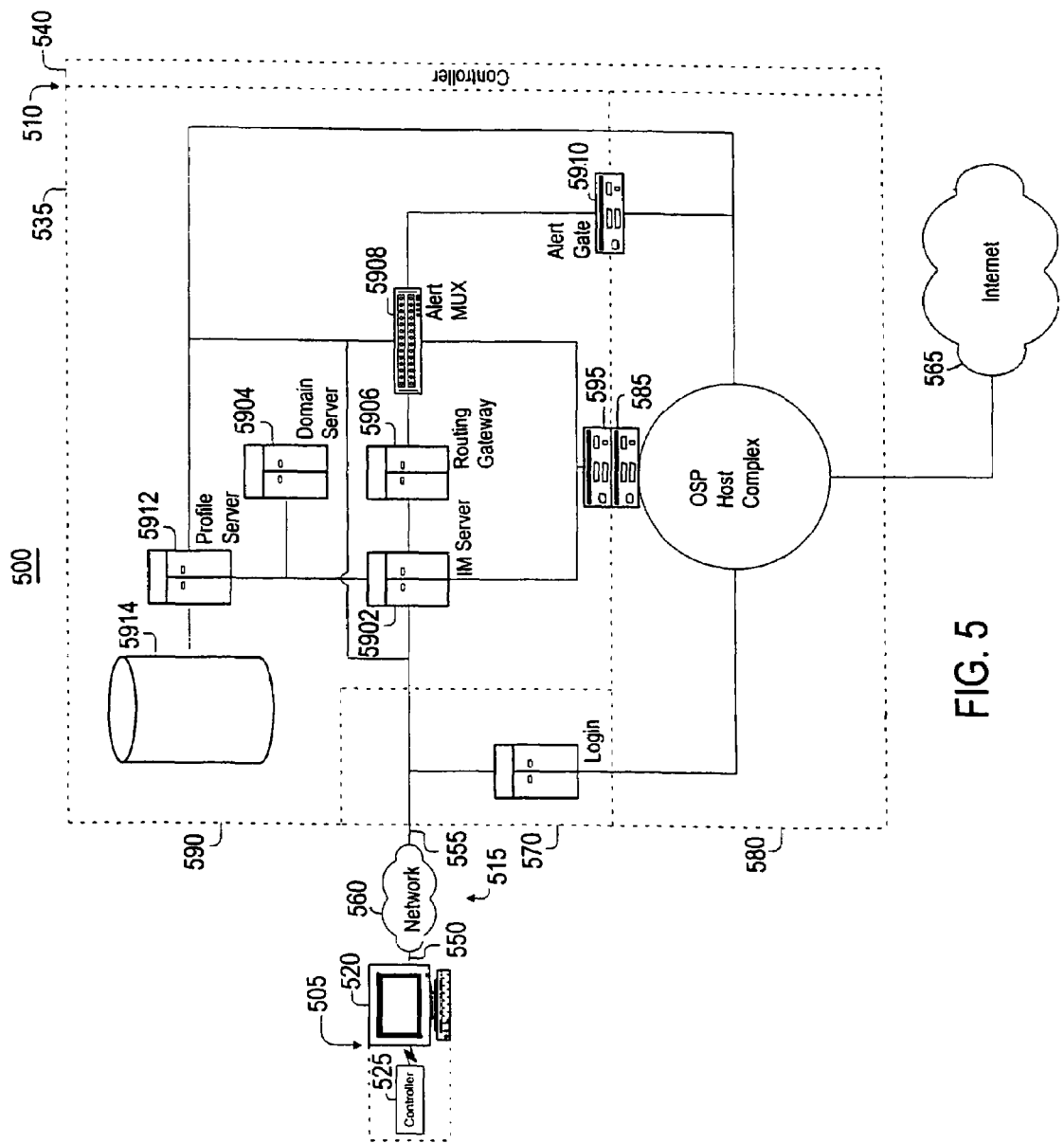

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communication system of FIG. 5 are broadly described above with respect to FIGS. 1-4. In particular, the client system 505 and the communications link 515 typically have attributes comparable to those described with respect to client systems 105, 205, 305, and 405 and communications links 115, 215, 315, and 415 of FIGS. 1-4, respectively. Likewise, the host system 510 of FIG. 5 may have attributes comparable to and may illustrate one possible embodiment of the host systems 110, 210, 310, and 410 shown in FIGS. 1-4, respectively. However, FIG. 5 describes an aspect of the host system 510, focusing primarily on one particular implementation of IM host complex 590.

The client system 505 includes a client device 520 and a client controller 525. The client controller 525 is generally capable of establishing a connection to the host system 510, including the OSP host complex 580, the IM host complex 590 and/or the Internet 565. In one implementation, the client controller 525 includes an IM application for communicating with servers in the IM host complex 590 utilizing exclusive IM protocols. The client controller 525 also may include applications, such as an OSP client application and/or an Internet browser application, for communicating with elements such as the OSP host complex 580 and the Internet 565.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. However, in other implementations, as described above, the host controller 540 may include any of several other programs, machines, and devices operating independently or collectively to control the host device 535.

The host system 510 includes a login server 570 capable of enabling communications between client systems 505 and various elements of the host system 510, including elements such as the OSP host complex 580 and IM host complex 590; login server 570 is also capable of authorizing access by the client system 505 and those elements. The login server 570 may implement one or more authorization procedures to enable simultaneous access to one or more of the elements. The OSP host complex 580 and the IM host complex 590 are connected through one or more host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 to begin an instant messaging session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain servers 5904 may support associated services, such as, for example, administrative matters, directory services, chat and interest groups. The domain servers 5904 can be used to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

In the implementation of FIG. 5, IM server 5902 is directly or indirectly connected to a routing gateway 5906. The routing gateway 5906 facilitates the connection between the IM server 5902 and one or more alert multiplexors 5908. For example, routing gateway 5906 may serve as a link minimization tool or hub to connect several IM servers 5902 to several alert multiplexors 5908. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing a hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie) used to gain access to the identified multiplexor 5908. The client system 505 then uses the IP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to enable communication with the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. However, the alert multiplexor 5908 also may communicate with the OSP host complex 580 through the IM gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Thereafter, upon detecting an alert feed, the alert gate 5910 contacts the alert multiplexor 5908, which in turn, informs the appropriate client system 505 of the detected alert feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data includes, for example, the subscriber's buddy list, alert preferences, designated stocks, identified interests, geographic location and other demographic data. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using a new or different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 5912 also may communicate with other servers in the OSP host complex 590 to share subscriber profile data with other services. Alternatively, user profile data may be saved locally on the client device 505.

Figure 6:
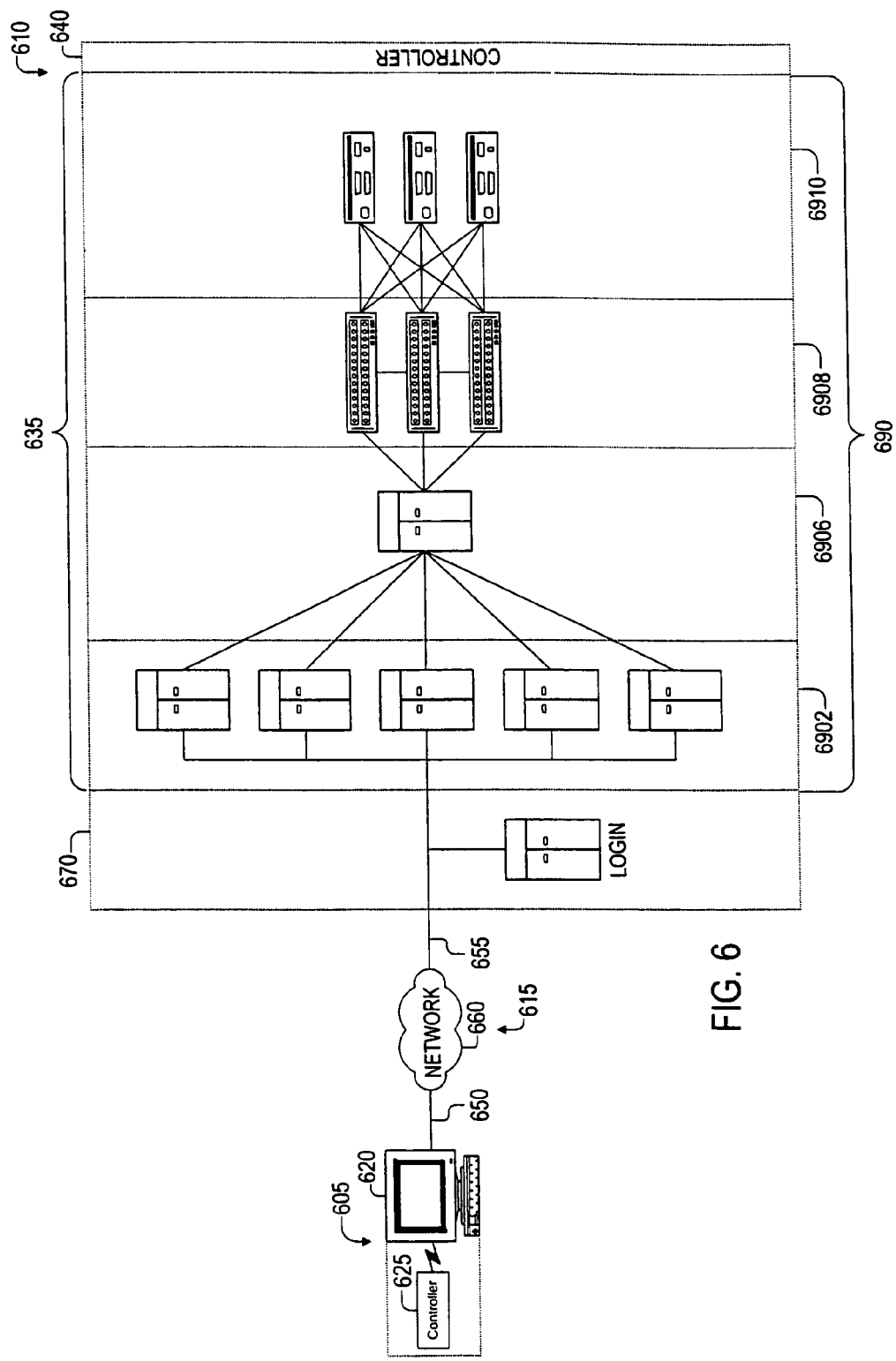

Referring to FIG. 6, a communications system 600 is capable of delivering and exchanging information between a client system 605 and a host system 610 through a communication link 615. Client system 605 typically includes one or more client devices 620 and one or more client controllers 625 for controlling the client devices 620. Host system 610 typically includes one or more host devices 635 and one or more host controllers 640 for controlling the host devices 635. The communications link 615 may include communication pathways 650, 655 enabling communications through the one or more delivery networks 660.

Examples of each element within the communication system of FIG. 6 are broadly described above with respect to FIGS. 1-5. In particular, the client system 605 and the communications link 615 typically have attributes comparable to those described with respect to client systems 105, 205, 305, 405 and 505 and communications links 115, 215, 315, 415 and 515 of FIGS. 1-5, respectively. Likewise, the host system 610 of FIG. 6 may have attributes comparable to and may illustrate one possible embodiment of the host systems 110, 210, 310, 410 and 510 shown in FIGS. 1-5, respectively. However, FIG. 6 describes several aspects of one implementation of the host system 610 in greater detail, focusing primarily on one particular implementation of the login server 670 and IM host complex 690.

The client system 605 includes a client device 620 and a client controller 625. The client controller 625 is generally capable of establishing a connection to the host system 610, including the IM host complex 690. In one implementation, the client controller 625 includes an IM application for communicating with servers in the IM host complex 690 utilizing exclusive IM protocols.

The host system 610 includes a host device 635 and a host controller 640. The host controller 640 is generally capable of transmitting instructions to any or all of the elements of the host device 635. For example, in one implementation, the host controller 640 includes one or more software applications loaded on one or more elements of the host device 635. However, in other implementations, as described above, the host controller 640 may include any of several other programs, machines, and devices operating independently or collectively to control the host device 635.

The host system 610 includes a login server 670 capable of enabling communications between client systems 605 and various elements of the host system 610, including elements such as the IM host complex 690 and the OSP host complex 680; login server 670 is also capable of authorizing access by the client system 605 and those elements. The IM host complex 690 includes an IM server network 6902, a routing gateway 6906, an alert multiplexor network 6908, and one or more alert gates 6910. The IM server network 6902 may include an interconnected network of IM servers and the alert multiplexor network 6908 may include an interconnected network of alert multiplexors. In the implementation of FIG. 6, the IM server network 6902 and the alert multiplexor network 6908 are interconnected by a routing gateway 6906 that serves as a common hub to reduce the number of connections. Each IM server within IM server network 6902 can directly or indirectly communicate and exchange information with one or more of the alert multiplexors in the alert multiplexor network 6908. Each of the alert multiplexors in the alert multiplexor network 6908 may be connected to several alert gates 6910 that receive different types of alerts.

During a session, a subscriber typically will be assigned to one IM server in the IM server network 6902 and to one alert multiplexor in the alert multiplexor network 6908 based on one or more hashing techniques. In one implementation, for example, each IM server in the IM server network 6902 may be dedicated to serving a particular set of registered subscribers. Because all of the IM servers can communicate with each other, all subscribers can communicate with each other through instant messaging. However, the IM servers and the alert multiplexors are capable of storing subscriber information and other electronic content that may be accessed by the other IM servers and alert multiplexors. Thus, in another implementation, each alert multiplexor in the alert multiplexor network 6908 may be dedicated to storing information about a particular set or subset of alerts. Because all of the alert multiplexors can communicate with each other, all registered subscribers can receive all types of alerts. This networking arrangement enables the load to be distributed among the various servers in the IM host complex 690 while still enabling a subscriber to communicate, share information, or otherwise interact with other subscribers and servers in the IM host complex 690.

Figure 7:
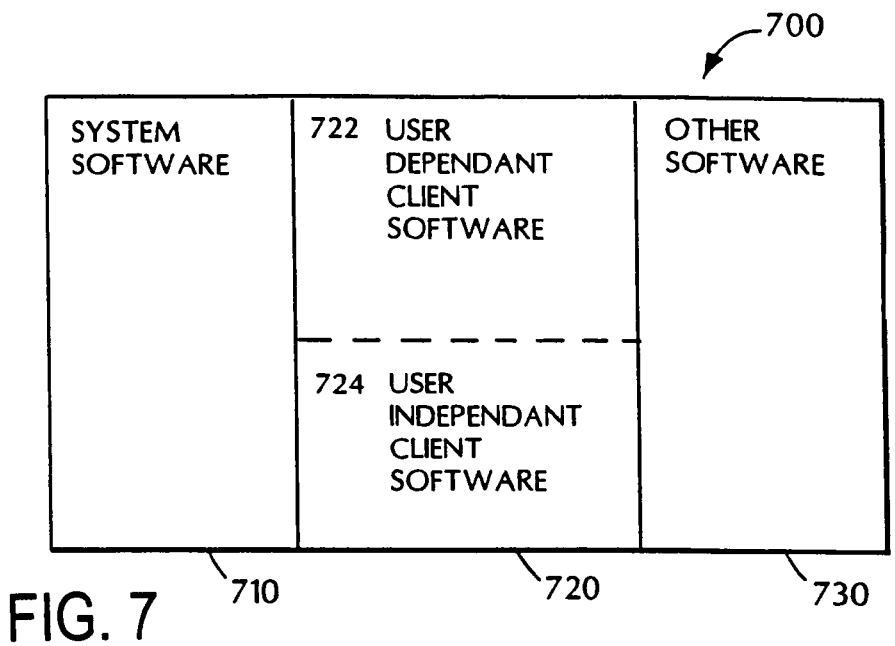
FIG. 7 is a block diagram illustrating a logical configuration of software elements within the communication system of FIG. 1.

FIG. 7 is a block diagram illustrating the contents 700 of memory within a client communication system that is configured to communicate with a host communication system. The client communication system is generally illustrated by items 105, 205, 305, 405, 505, and 605 of FIGS. 1-6. The host communication system with which the client communication system communicates is generally illustrated by items 110, 210, 310, 410, 510, and 610 of FIGS. 1-6. However, either may be incorporated into other types of communication systems.

As shown, the memory contents 700 of the client communication system include system software 710, client software 720, and other software 730. The system software 710 generally includes programs and data enabling operation of the client communication system, and the other software 730 generally includes other programs and data enabling the performance of applications and storage and retrieval of data using the client communication system. The system software 710 and other software 730 are generally stored in the memory of a client device such as that shown and described with respect to items 120, 220, 320, 420, 520, and 620 of FIGS. 1-6.

The client software 720 generally includes programs and data files capable of enabling communication between the client communication system and the host communication system. The client software 720 is generally stored on the client communication system and loaded into the memory of a client controller, such as that shown and described with respect to items 125, 225, 325, 425, 525, and 625 of FIGS. 1-6, when communications are to be initiated with a host communication system.

The client software 720 generally includes configuration data for a communication device (e.g., modem) resident on the client communication system, and information for contacting the host communication system. The client software 720 also generally includes information (e.g., login and password information) for performing handshaking with the host communication system, and may include other information such as user preference information.

The client software 720 generally includes several modules (not shown) for performing various functions. Modules of the client software 720 may include user-dependent software 722, user-independent software 724, or a combination of the two. User-dependent software 722 includes data related to particular users, such as demographic data, personalizable configuration data, and user-specific login data. The software 722 also may include data reflecting user system attributes, such as modem type and speed, and processor characteristics. By contrast, user-independent software 724 generally includes static information within the client software, such as fixed instructions and read only modules.

As will be described, identification of unauthorized client communication systems will generally be performed based on an inspection of user-independent software 724 since the contents of the user-independent software 724 can be predicted for the machines of different users. However, it may be possible to otherwise classify the client software to enable identification based on different criteria.

In general, the client software 720 is loaded at a predesignated location within the memory of the client communication system. However, because that memory may include other software loaded at the predesignated location, at least a portion of the client software 720 may be configured to load into an alternative location within the client communication system memory. This alternative location may be predesignated in the client software 720 or may be selectable by the client communication system. One implementation uses this distinction to classify the client software 720 based on the potential for volatility of the software's location within the memory of the client communication system. Specifically, portions of the client software 720 may be distinguished based on whether their contents are permitted to be loaded at locations that differ from predesignated memory locations. Similarly, portions of the client software may be distinguished based on whether their contents may be changed by their relocation or the relocation of other portions of the client software, e.g., due to an addressing scheme interrelating the portions of the client software 720.

Based on criteria of this type, the client software 720 may be parsed into virtual segments that remain static and virtual segments that may be dynamic. By combining this classification with the classification among user-dependant and user-independent segments discussed above with respect to FIG. 7, it is possible to identify the specific portions of the client software 720 that remain unchanged, notwithstanding variations in the user or memory location. Specific portions of client software 720 may be deemed unchanged for purposes of identification when, for instance, they are stored without interruption in the memory of a client communication system (i.e., no pointers to relocated code), or when they are simply unchanged with respect to the user or user's system (i.e., unmodified content). Specific portions of the client software 720 that are known to remain unchanged may be located on the client communication system and used for authentication as described below.

Although the software 710-730 shown by FIG. 7 appears to have a sequential orientation left-to-right, the relative orientation of these memory contents 700 may be arranged in any manner designated by the client communication system. Furthermore, although shown as being positioned at a single portion of the memory, at least the client software 720 may be disbursed among several portions of the memory.

Figure 8:
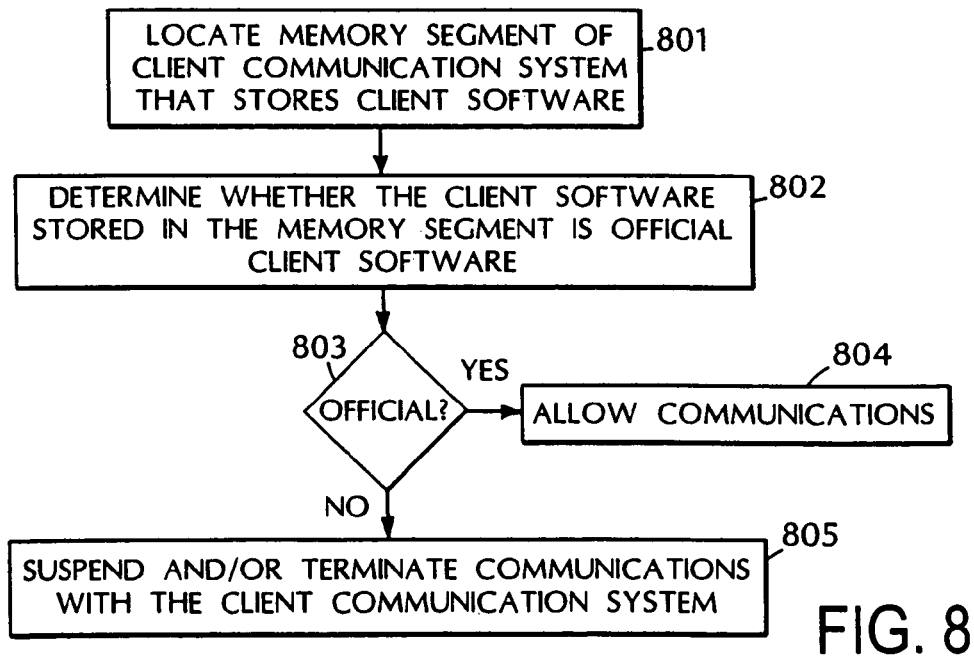
FIG. 8 is a flowchart of a process performed in response to an authentication failure.

FIG. 8 is a block diagram illustrating an exemplary method 800 performed to identify an unauthorized client communication system seeking access to a host communication system. The processes described with respect to FIG. 8 are generally performed by a software module on the host communication system described above with respect to items 110, 210, 310, 410, 510, and 610 of FIGS. 1-6.

The method 800 includes locating a memory segment of a client communication system that stores client software (step 801), determining whether the client software stored in the memory segment of a client communication system seeking access is official client software (step 802), and sending a message to the client communication system and suspending or terminating communication with the client communication system when the client software is not official client software (step 803).

Locating a memory segment may include identifying a type or version of the client software, in which the memory segment storing client software is known. Locating the memory segment also may include receiving information from the client communication system during or after an initiation of communications, and determining the type or version of the client software being used by the client communication system to enable communications with a host communication system. For example, during or after an initiation of communications, performing a diagnosis on the client communication system may be performed to automatically determine the type or version of the client software.

Using the identified client type and/or version, it may be possible to locate a memory segment of the client communication system that stores client software by locating a memory segment that includes static client software that remains unchanged in memory segments of the official client communication systems, regardless of the client communication system upon which it is stored. For instance, one or more memory segments may be identified as including static client software that remains unchanged based on the particular type of client communication system upon which it is stored. The memory segment may also be located based on a random selection among several memory segments that include the client software, or based on a random selection among only the several memory segments that include client software that remains unchanged as described above.

To determine whether the software stored in the memory segment includes official software (step 802), the client software stored in the memory segment of the client communication system seeking access may be compared against corresponding client software within an official client communication system. This comparison may involve a comparison of the actual software stored on the memory segment with official client software from an official client communication system, or it may instead involve a comparison of the results of mathematical computations performed on each. For instance, the comparing may include performing a mathematical computation on the contents of the identified memory segment, performing the same computation on the corresponding segment of the official system, and comparing the results from the mathematical computations. The mathematical computations may include a hashing algorithm, such as a message digest algorithm (e.g., MD3, MD5) or a secured hash algorithm (e.g., SHA1), or other algorithms.

As illustrated in FIG. 8, several actions may be taken in response to a failure to authenticate, including one or more of terminating the communication session immediately or after a delay, requesting additional authenticating information, displaying an error message, and blocking further communication from the Internet protocol (IP) address of the accessing system. Other responses also may be appropriate.

Figure 9:
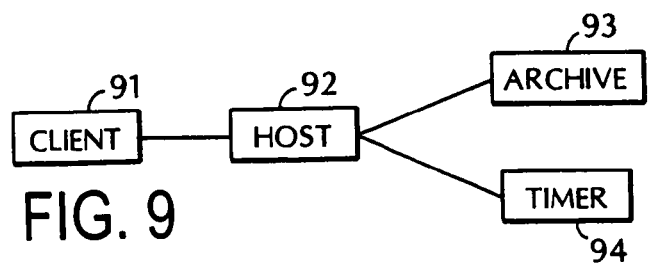
FIG. 9 is a block diagram illustrating logical elements of the system of FIG. 1.

FIG. 9 provides an exemplary view of the logical configuration 910 of software and hardware elements within the communication system and an exemplary process 920 performed by those logical elements. FIGS. 10A, 10B, and 10C show aspects 100A, 100B, and 100C, respectively, of the process used to identify unauthorized communication systems. In FIGS. 10A-10C, each of the illustrated system components is represented by a vertical line consisting of solid and broken line segments. The vertical dimension of each figure represents time (e.g., points lower in the figure represent later times than points higher in the figure), although not necessarily to scale. The solid segments of each component line denote periods of time during which a particular component is active, each being labeled with a brief description of the activity that the component is then performing. The broken line segments denote periods of time when the component is inactive, with respect to this process. The horizontal arrows denote interactions between two components, the arrows pointing from the originating component to the receiving component. The arrow labels describe the data being transferred between the components.

More specifically, FIG. 9 shows an example of logical interconnections 910 among several software and hardware elements. In the implementation shown by FIG. 9 and referenced by FIGS. 10A-10C, four (4) elements are specifically called out—client 91, host 92, timer 93, and archive 94.

Client 91 represents software loaded in the memory of a client communication system, such as that shown and described above with reference to FIGS. 1-7.

Host 92 represents software loaded in the memory of a host communication system, such as that shown and described above with reference to FIGS. 1-6. As described previously with respect to FIGS. 1-7, the client 91 and host 92 may communicate using the Internet or some other communication medium.

Timer 93 represents a timing mechanism that may be implemented using hardware and/or software, e.g., a hardware device together with controlling software. Timer 93 is typically integrated into the operating system of the host communication system. As such, host 92 may program timer 93 to provide an alert after a specified interval has elapsed.

Archive 94 represents a storage medium (e.g., a disk) storing one or more versions (e.g., database) of officially sanctioned client software currently available to access the host communication system. The archive may reside in storage on the host communication system, or in storage on another computer or communication system that is accessible to the host communication system. The archive may be indexed using client platform (e.g. Windows, Macintosh) and version number, or otherwise as appropriate.

Process 100A of FIG. 10A illustrates an example of an initial exchange between the client 91 and host 92. Specifically, during the sign-on stage, the client 91 sends a message (step 101) identifying its platform (i.e. hardware and operating system) and implementation version to host 92. Based on this information, host 92 requests a memory map of client 91 from archive 94 (steps 102, 103, 104). The requested memory map distinguishes locations in the memory of client 91 that remain unchanged, and hence remain predictable, from locations within the client memory that remain subject to change. The unchanged portions of memory tend to maintain identical contents both in client 91 and in archive 94. Therefore, using the memory map, host 92 randomly selects (step 105) one or more contiguous segments from the unchanged locations. For each selected segments, the host 92 then transmits a descriptor (step 106) identifying the segment location to client 91. The descriptor typically includes the location of the segment module, its offset within that module, and its length. Concurrently, the host 92 starts (107) the timer 93.

Thereafter, a first scenario, depicted in FIG. 100B, may be experienced by official and unofficial clients. Under this scenario, upon receiving the segment descriptors, the client computes a message digest of the requested segments (steps 108 and 109). In one implementation, two digest algorithms are used: the "null" algorithm, which simply returns a concatenation of the bytes in the segments, and the message-digest algorithm (e.g., MD5 developed by RSA Data Security, Inc). Various digest algorithms may be substituted for the message-digest algorithm, but message digests in which it is computationally infeasible to produce two different messages with the same digest are preferred. Both the null algorithm and MD5 have this property.

Upon receiving the digest, the host 92 stops the timer 93 (step 110), and retrieves its own copy of the selected segments from the archive 94 (steps 111, 112 and 113). It then independently computes the digest (step 114) and compares its result with the digest obtained from the client 91 (step 115). If the digests match, the client 91 is permitted to stay online. If the digests do not match, the client 91 is presumed an unauthorized communication system that is therefore disconnected (step 116).

Conversely, a second scenario, depicted in FIG. 10B, may arise when clients 91 do not respond with a digest. If the host 92 does not receive a digest from the client 91, it will not stop the timer 93 (step 110). The timer 93 will expire approximately 30 seconds from the time it was started and will notify the server 91 (step 117). At this point, the host 92 will disconnect the client 91 (step 118).

Any or all of the processes described above may be implemented during an initiation of communications between the client communication system and the host communication system, or at any time thereafter. For instance, the above process may be implemented after communications have been ongoing for a fixed or random period of time.

A number of implementations have been described above. Nevertheless, it will be understood that various modifications may be made without departing from the spirit and scope of the invention.

For instance, the above features may be applied to any system involving communication between two or more computer systems where it is necessary for one or more of the computer systems to authenticate another of the computer systems. Particular utility exists for application service providers (e.g., instant messaging application providers) and e-commerce driven systems seeking to authenticate computer systems seeking or receiving access thereto. When used in this manner, this process and system may prevent access to host communication systems by unauthorized computer systems, thereby preventing harms such as loss of advertising revenue, loss of revenue otherwise generated through the controlled redirection of those users, and loss of service contract revenues resulting from defection of clients otherwise chasing service contracts under the host communication systems.

The above system and process may also be used to verify that other types of specified software applications are loaded and operating on any machine being checked, and the like.

As described, one aspect of the above implementations authenticates a client communication system by focusing on properties of an official client communication system rather than on the peculiarities in the behavior of impostor clients.

Another aspect of the above implementations involves the random use of various memory contents for authentication, thus requiring an impostor client to duplicate virtually every aspect of the official client software object code in order to consistently authenticate. Such duplication may increase the size of the imposter client system software, requiring increased the download time and footprint size therefor.

Still other aspects of the above implementations involve varying the timing of the authentication, and varying the response to unauthorized client communication systems. Taken independently or in combination with variations in the memory location being used for authentication, these aspects make it difficult for third parties to determine how this authentication is performed, and thus difficult to defeat.

Yet another aspect of the overall implementation involves the transfer and comparison of results from mathematical computations performed on memory segments, rather than transferring and comparing the contents of the memory segments themselves. Using this manner, bandwidth requirements and download time are reduced.

What is claimed is:

1. A method for identifying unauthorized client software seeking to communicate with a communication system, the method comprising:

receiving, from a client communication system that stores client software used to communicate with a communication system, an indication of a platform of the client communication system and an implementation version of the client software;

based on the indicated platform and implementation version, identifying a memory map of the client software, the memory map identifying at least one memory segment within the client software that is designated to remain unchanged during authorized use of the client software;

selecting one or more contiguous segments from the at least one memory segment that is designated to remain unchanged;

sending to the client communication system an indication of the selected one or more contiguous segments;

receiving, from the client communication system, a first digest of the selected one or more contiguous segments;

accessing a second digest to compare with first digest received from the client communication system;

comparing the first digest received from the client communication system with the second digest; and identifying the client communication system as an unauthorized client communication system when the first digest does not correspond to the second digest.

2. The method of claim 1 wherein an indication of a platform comprises an indication of hardware and an operating system.

3. The method of claim 1 wherein an indication of the selected one or more contiguous segments comprises location of at least one of the selected one or more contiguous segments.

4. The method of claim 3 wherein an indication of the selected one or more contiguous segments comprises an offset of the at least one of the selected one or more contiguous segments.

5. The method of claim 3 wherein an indication of the selected one or more contiguous segments comprises a length of the at least one of the selected one or more contiguous segments.

6. The method of claim 1 further comprising using a null algorithm to determine the second digest to compare with first digest received from the client communication system.

7. The method of claim 1 further comprising using a message-digest algorithm to determine the second digest to compare with first digest received from the client communication system.

8. The method of claim 1 further comprising terminating communications from the client communication system when the first digest does not correspond to the second digest.

9. The method of claim 1 further comprising terminating communications from the client communication system when a predetermined amount of time has passed without receipt of the first digest.

10. The method of claim 9 wherein terminating communications from the client communication system when a predetermined amount of time has passed without receipt of the first digest comprises terminating communications from the client communication system when a predetermined amount of time has passed since sending to the client communication system the indication of the selected one or more contiguous segments.

11. An apparatus for identifying unauthorized client software seeking to communicate with a communication system, the apparatus being configured to:

receive, from a client communication system that stores client software used to communicate with a communication system, an indication of a platform of the client communication system and an implementation version of the client software;

identify, based on the indicated platform and implementation version, a memory map of the client software, the memory map identifying at least one memory segment within the client software that is designated to remain unchanged during authorized use of the client software;

select one or more contiguous segments from the at least one memory segment that is designated to remain unchanged;

send to the client communication system an indication of the selected one or more contiguous segments;

receive, from the client communication system, a first digest of the selected one or more contiguous segments;

access a second digest to compare with first digest received from the client communication system;

compare the first digest received from the client communication system with the second digest; and identify the client communication system as an unauthorized client communication system when the first digest does not correspond to the second digest.

12. The apparatus of claim 11 wherein an indication of a platform comprises an indication of hardware and an operating system.

13. The apparatus of claim 11 wherein an indication of the selected one or more contiguous segments comprises location of at least one of the selected one or more contiguous segments.

14. The apparatus of claim 13 wherein an indication of the selected one or more contiguous segments comprises an offset of the at least one of the selected one or more contiguous segments.

15. The apparatus of claim 13 wherein an indication of the selected one or more contiguous segments comprises a length of the at least one of the selected one or more contiguous segments.

16. The apparatus of claim 11 wherein the apparatus is further configured to use a null algorithm to determine the second digest to compare with first digest received from the client communication system.

17. The apparatus of claim 11 the apparatus is further configured to use a message-digest algorithm to determine the second digest to compare with first digest received from the client communication system.

18. The apparatus of claim 11 further configured to terminate communications from the client communication system when the first digest does not correspond to the second digest.

19. The apparatus of claim 11 further configured to terminate communications from the client communication system when a predetermined amount of time has passed without receipt of the first digest.

20. The apparatus of claim 9 wherein terminating communications from the client communication system when a predetermined amount of time has passed without receipt of the first digest comprises terminating communications from the client communication system when a predetermined amount of time has passed since sending to the client communication system the indication of the selected one or more contiguous segments.

21. A system for identifying unauthorized client software seeking to communicate with a communication system, the system comprising:

means for receiving, from a client communication system that stores client software used to communicate with a communication system, an indication of a platform of the client communication system and an implementation version of the client software;

means for identifying, based on the indicated platform and implementation version, a memory map of the client software, the memory map identifying at least one memory segment within the client software that is designated to remain unchanged during authorized use of the client software;

means for selecting one or more contiguous segments from the at least one memory segment that is designated to remain unchanged;

means for sending to the client communication system an indication of the selected one or more contiguous segments;

means for receiving, from the client communication system, a first digest of the selected one or more contiguous segments;

means for accessing a second digest to compare with first digest received from the client communication system;

means for comparing the first digest received from the client communication system with the second digest; and means for identifying the client communication system as an unauthorized client communication system when the first digest does not correspond to the second digest.

* * * * *